United States Patent
Song et al.

(10) Patent No.: US 8,003,271 B2
(45) Date of Patent: Aug. 23, 2011

(54) HEAT EXCHANGER FOR FUEL CELL

(75) Inventors: Tae-won Song, Seoul (KR); Seung-jae Lee, Seongnam-si (KR)

(73) Assignee: Samsung SDI Co., Ltd., Suwon-si, Gyeongii-do (KR)

( * ) Notice: Subject to any disclaimer, the term of this patent is extended or adjusted under 35 U.S.C. 154(b) by 1239 days.

(21) Appl. No.: 11/515,029

(22) Filed: Sep. 5, 2006

(65) Prior Publication Data

US 2007/0277960 A1      Dec. 6, 2007

(30) Foreign Application Priority Data

Jun. 2, 2006   (KR) ...................... 10-2006-0049997

(51) Int. Cl.
*H01M 8/04* (2006.01)

(52) U.S. Cl. ........ 429/436; 429/434; 429/437; 429/439; 429/442; 429/120; 123/41.2; 123/41.21; 123/41.27; 123/41.5; 165/272; 165/274; 165/104.27; 165/104.32; 165/163

(58) Field of Classification Search .................. 165/301, 165/104.27, 104.32, 163; 123/41.21, 41.51, 123/41.5, 41.54, 41.2; 429/26, 34, 120, 24, 429/39, 38, 22, 20, 434, 436, 437, 439, 442

See application file for complete search history.

(56) References Cited

U.S. PATENT DOCUMENTS

| | | | |
|---|---|---|---|
| 3,774,675 A | 11/1973 | Yoshiro | |
| 4,941,550 A * | 7/1990 | Blake | 184/5.1 |
| 5,176,112 A * | 1/1993 | Sausner et al. | 123/41.21 |
| 5,258,242 A * | 11/1993 | Dean et al. | 429/54 |
| 5,953,924 A | 9/1999 | Li et al. | |
| 6,053,132 A * | 4/2000 | Evans | 123/41.5 |
| 6,355,368 B1 * | 3/2002 | Kralick | 429/120 |

FOREIGN PATENT DOCUMENTS

| | | |
|---|---|---|
| CN | 2074395 | 4/1991 |
| CN | 2148225 | 12/1993 |
| WO | WO 2005008819 A2 * | 1/2005 |

OTHER PUBLICATIONS

Certificate of Patent No. ZL 200610153702 issued in the corresponding Chinese application on Oct. 7, 2009 (including the Chinese application CN 100547839C).

* cited by examiner

*Primary Examiner* — John K Ford
(74) *Attorney, Agent, or Firm* — Lee & Morse, P.C.

(57) ABSTRACT

A heat exchanger that can mechanically automatically control a level of cooling water according to heat generation of the fuel cell. The heat exchanger includes a housing having a cooling water inlet and an outlet connected to a fuel cell stack, a moving plate which moves reciprocally in the housing and discharges cooling water filled in the housing to the stack when it moves in a one direction and when it receives a steam pressure from the stack it moves in an opposite direction, and an elastic member that applies a force to the moving plate in the one direction. The heat exchanger can automatically maintain the level of cooling water despite a difference in heat generated between a full and a partial load operation of the fuel cell obviating complicated electronics such as a thermosensor, a valve, or a controller. Also, under a partial load, the exposure of flow channels to superheated steam is avoided, thereby extending the lifetime of the fuel cell.

16 Claims, 11 Drawing Sheets

RELATED ART

HEAT EXCHANGER FOR FUEL CELL

CROSS-REFERENCE TO RELATED PATENT APPLICATIONS

This application claims the benefit of Korean Application No. 2006-49997, filed Jun. 2, 2006, in the Korean Intellectual Property Office, the disclosure of which is incorporated herein by reference.

BACKGROUND OF THE INVENTION

1. Field of the Invention

Aspects of the present invention relate to a heat exchanger for a fuel cell, and more particularly, to a heat exchanger that can automatically control the level of cooling water according to the heat generation of a fuel cell.

2. Description of the Related Art

Figure 1:
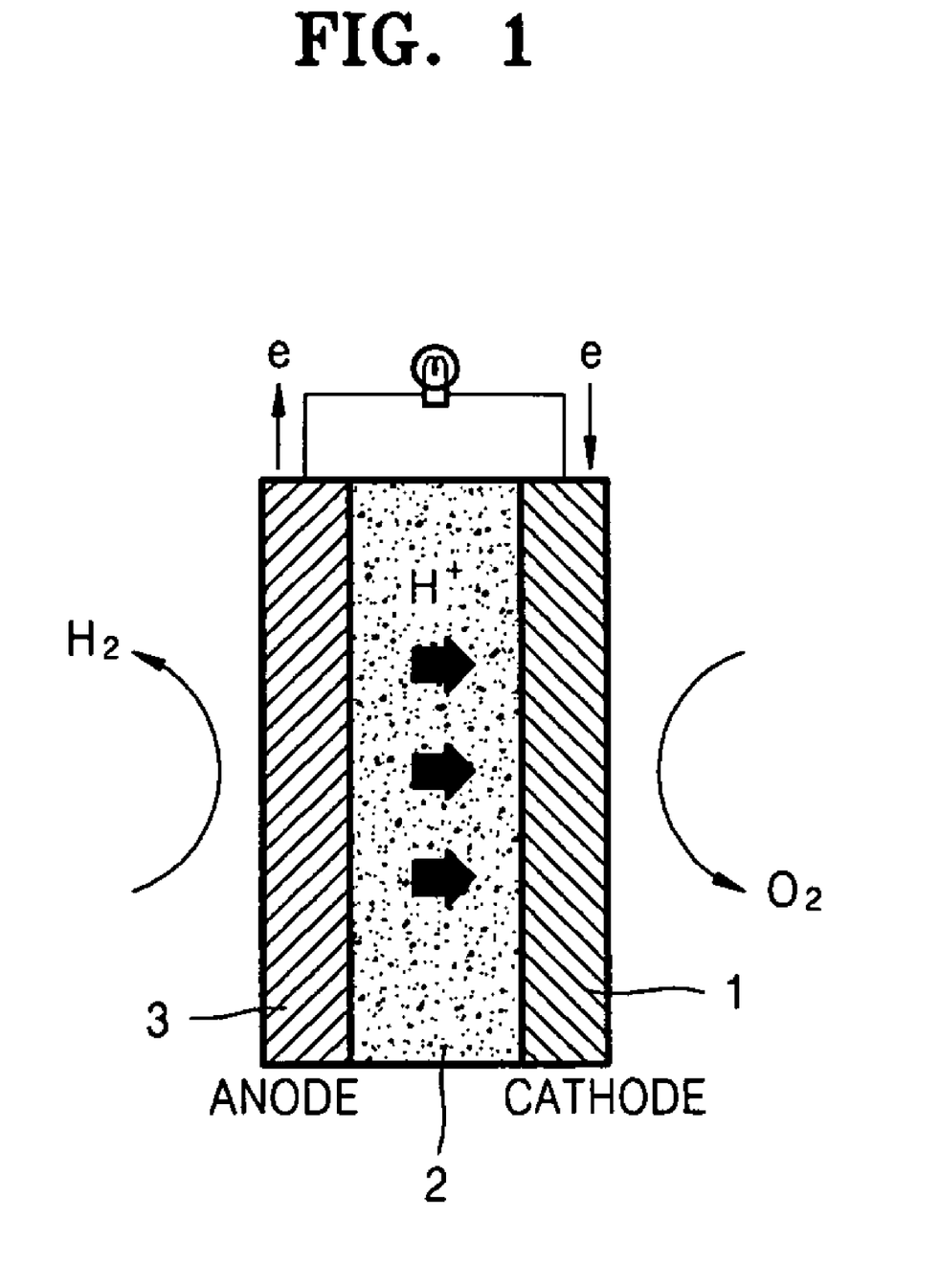
FIG. 1 is a schematic drawing showing the principle of generating electricity of a conventional fuel cell.
Figure 2:
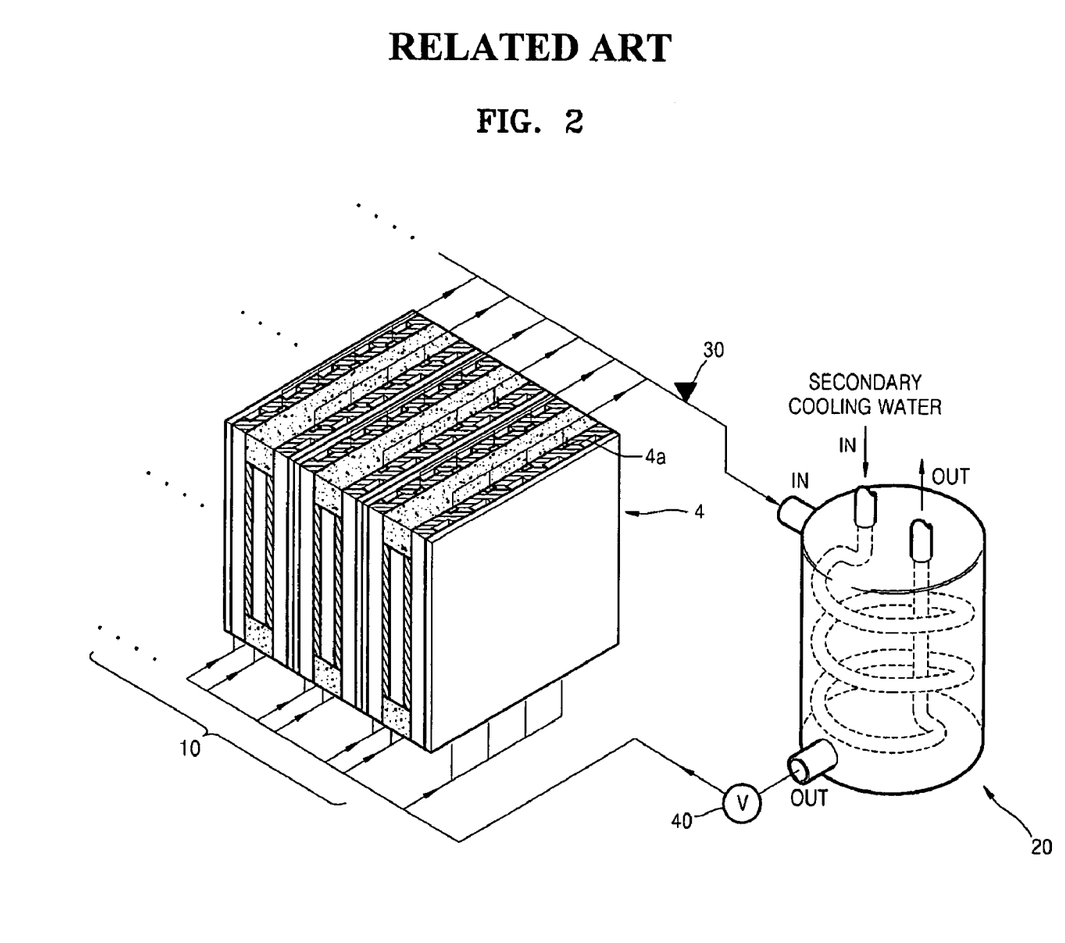
FIG. 2 is a perspective view of a structure of a fuel cell having a conventional heat exchanger.

A fuel cell is an apparatus that transforms chemical energy of a fuel directly into electrical energy through a chemical reaction. Thus, the fuel cell is a kind of electric generator that can generate electricity as long as a fuel is supplied. FIG. 1 is a schematic drawing showing the principle of generating electricity from a conventional fuel cell. Referring to FIG. 1, electricity is generated by a reverse reaction of the electrolysis of water taking place through an electrolyte membrane 2 when air, which contains oxygen, is supplied to a cathode 1 and a fuel containing hydrogen is supplied to an anode 3. However, a voltage of the electricity generated from a unit cell 4 is not usually high enough to be used. Therefore, as depicted in FIG. 2, a plurality of unit cells 4 is connected in series in a stack 10.

Figure 3:
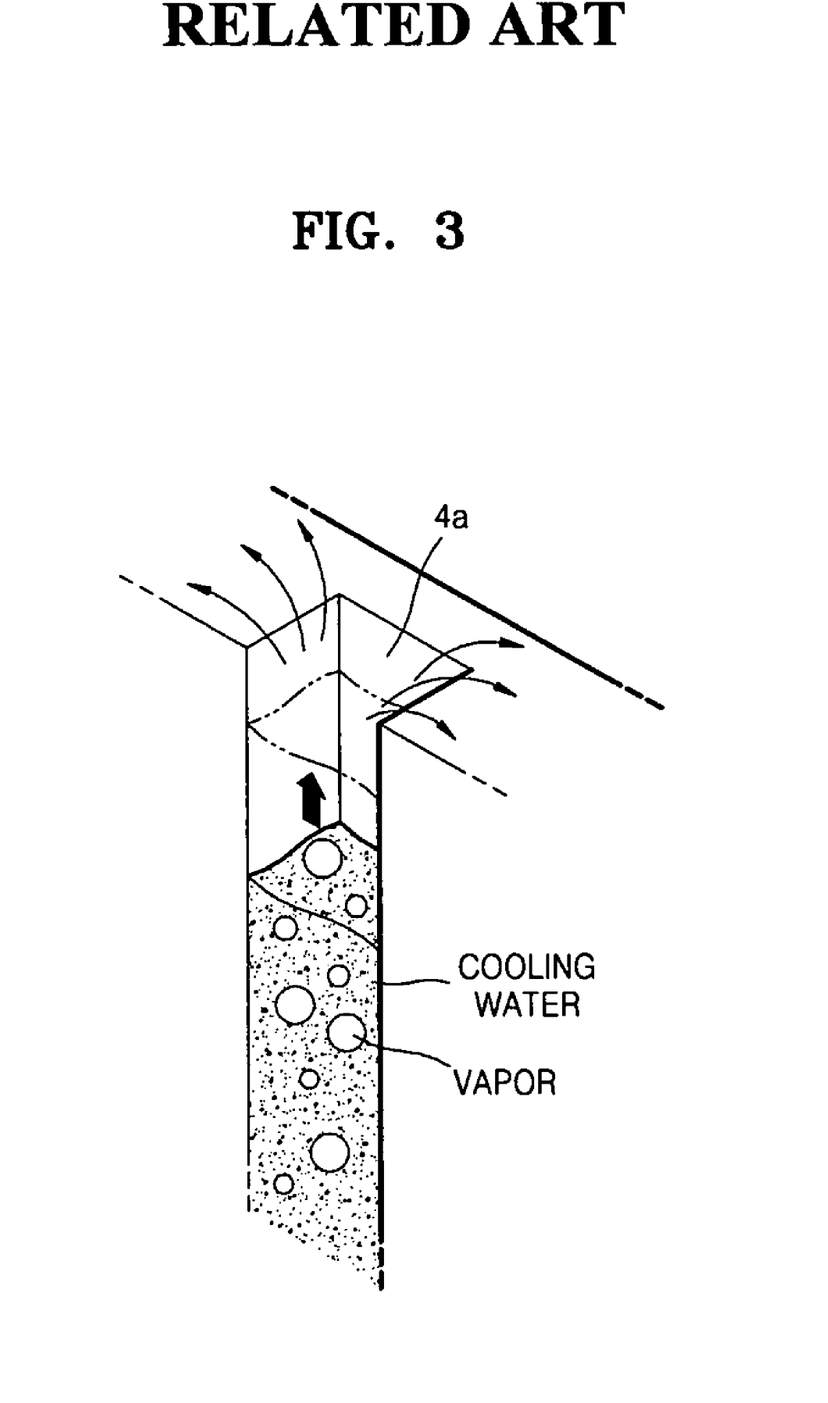
FIG. 3 is a partial perspective view of a flow channel in a stack of the fuel cell of FIG. 2.

During the electrochemical reaction, not only electricity but also heat is generated. Therefore, to maintain a smooth operation of the fuel cell, the heat must be continuously dissipated. Accordingly, a heat exchanger 20, as depicted in FIG. 2, is provided in the fuel cell. Referring to FIG. 2, flow channels 4a for passing cooling water for exchanging heat are formed in each unit cell 4 of the fuel cell. The cooling water absorbs heat from the stack 10 while passing through the flow channels 4a. The cooling water that absorbs the heat is cooled down by secondary cooling water in the heat exchanger 20, and is re-circulated through the flow channels 4a of the stack 10. At this time, the circulation of the cooling water is not achieved by an additional force, but by natural convection of water, that is, by overflow of boiling water due to the heat absorbed from the surroundings. For example, as depicted in FIG. 3, when the cooling water is filled in the flow channels 4a at an appropriate level, the cooling water starts absorbing heat, and as a result, the cooling water starts boiling and overflows. The cooling water that overflows enters the heat exchanger 20 and is cooled down by secondary cooling water. Afterward, the cooled cooling water is re-circulated in the stack 10.

However, in many cases, the fuel cell is operated at a load smaller than a designed load. This is called a partial load operation state wherein the fuel cell generates less power than the designed power. In this state, the amount of heat generated is reduced, and thus, the amount of heat absorbed by the cooling water is also reduced. Thus, the convection of the cooling water is not achieved properly since the cooling water does not boil enough to overflow. In the related art, to solve this problem, the temperature of the cooling water entering the heat exchanger 20 is measured using a thermo-sensor 30. If the temperature of the cooling water is lower than a designed value, that is, the fuel cell operates in a partial load operation state, the cooling operation is not performed until the temperature of the cooling water in the stack 10 rises enough so that the cooling water can be circulated by closing a solenoid valve 40 installed at a cooling water outlet of the heat exchanger 20.

However, in this method, the cooling water does not overflow but fluctuates, that is, the water level in the stack 10 goes up and down until the temperature of the cooling water rises enough to be circulated. Thus, some regions of the flow channels 4a do not come in to contact with the cooling water for a period of time. As a result, these regions are exposed to superheated steam for a period of time, and thus the thermal resistance of the stack 10 is greatly reduced.

Also, this system requires complicated control devices such as the thermo-sensor 30 for measuring the temperature, the solenoid valve 40 for closing and opening the flow channels 4a, and a controller (not shown) for controlling these elements.

SUMMARY OF THE INVENTION

Aspects of the present invention provide a heat exchanger for a fuel cell, the heat exchanger having a simple structure that can ensure thermal safety in a stack of the fuel cell in a partial load operation state.

According to an aspect of the present invention, there is provided a heat exchanger for a fuel cell, comprising: a housing having a cooling water inlet and a cooling water outlet connected to a stack of the fuel cell; a moving plate which moves reciprocally in the housing and discharges cooling water filled in the housing to the stack through the cooling water outlet when it moves in one direction and receives a pressure of steam entering through the cooling water inlet when it moves in an opposite direction; and an elastic member that applies an elastic force in the one direction to the moving plate.

While not required in all aspects, the heat exchanger may further comprise a separation element that separates an upper space of the moving plate where the steam pressure is applied from a lower space of the moving plate where an elastic force of the elastic member is applied to prevent the flow of cooling water between the upper space and lower space.

While not required in all aspects, the separation element may comprise an O-ring that is inserted into a rim portion of the moving plate to seal a gap between the moving plate and an inner wall of the housing, and one of a diaphragm that covers the space under the moving plate where the elastic force is applied or a bellows tube that surrounds the elastic member.

While not required in all aspects, the housing may comprise a flow channel for passing secondary cooling water for exchanging heat with the cooling water that circulates in the stack, and an air hole may be formed in the housing in an area where the elastic member is disposed so that air acts in the housing.

While not required in all aspects, the housing and the moving plate may be formed of one material selected from the group consisting of stainless steel, rubber, and polymer.

While not required in all aspects, the elastic member may comprise a first spring that applies an elastic force to the moving plate along the entire moving distance in the one direction and a second spring that applies an elastic force to the moving plate when the moving plate moves down by a predetermined distance in the opposite direction.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 4:
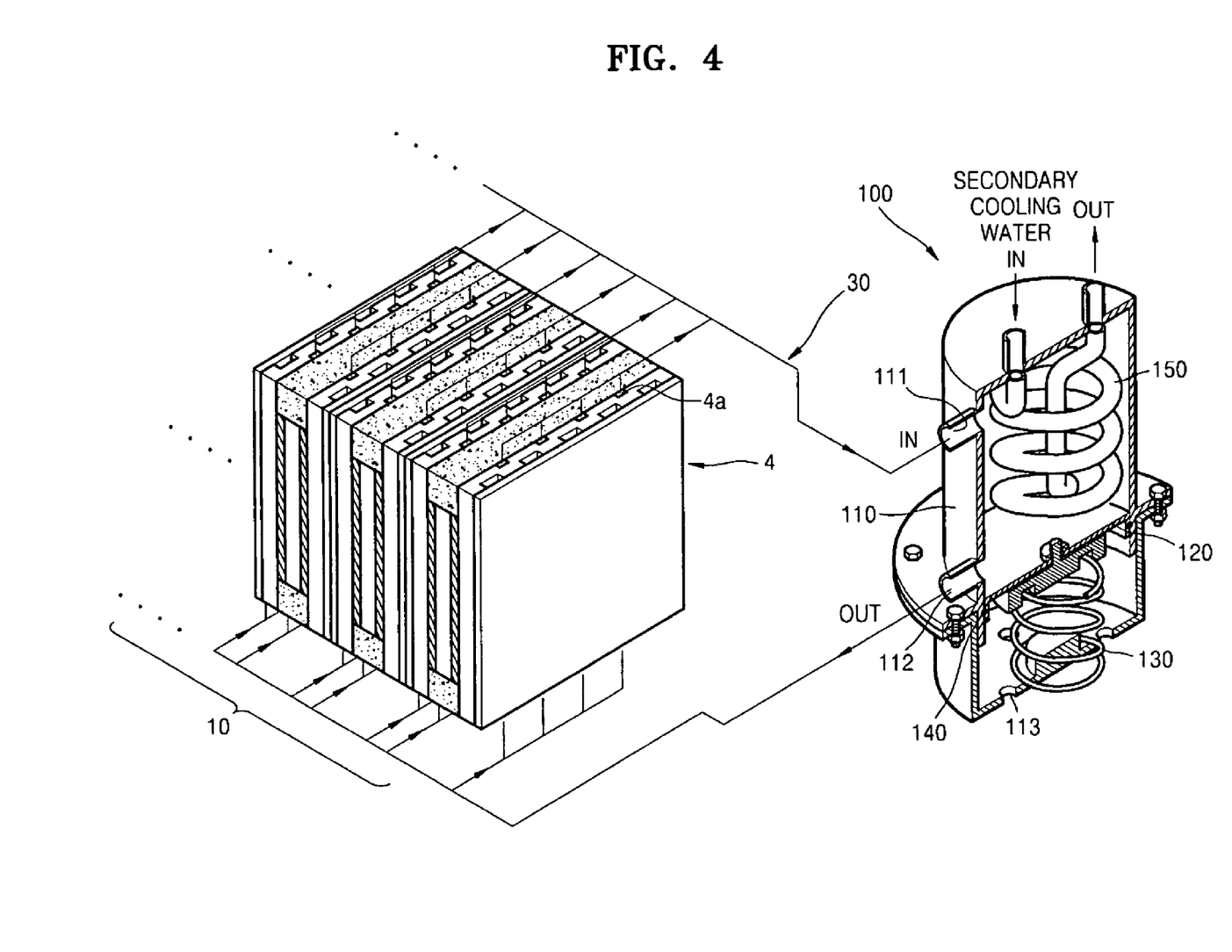
FIG. 4 is a cutaway perspective view of a fuel cell having a heat exchanger according to an embodiment of the present invention.

FIG. 4 is a cutaway perspective view of a fuel cell having a heat exchanger 100 according to an embodiment of the present invention.

Referring to FIG. 4, the heat exchanger 100 includes a housing 110 having an inlet 111 and an outlet 112 for cooling water circulating along flow channels 4a formed in a stack 10, a moving plate 120 which moves reciprocally in the housing 110, and a spring 130 which is an elastic member and applies an elastic force to the moving plate 120 to make it move upward.

The moving plate 120 serves as a bottom surface of an inner space of the housing 110, where cooling water entering through the inlet 111 is filled. An upper surface of the moving plate 120 receives a pressure of steam entering from the stack 10, and a lower surface of the moving plate 120 receives an elastic force of the spring 130 together with atmospheric pressure through an air hole 113. Accordingly, the moving plate 120 stops at a position where an equilibrium state is achieved between the steam pressure on the upper surface and the elastic force acting on the lower surface. Reference numeral 140 denotes an O-ring, which is an element for separating the upper and lower spaces of the moving plate 120 and seals a gap between the moving plate 120 and an inner wall of the housing 110. Although the description of the embodiment is made with reference to upper and lower, the present invention is not limited to such a vertical orientation. For example, the moving plate 120, elastic spring 130 and O-ring 140 can be arranged on one side of the housing 110 or otherwise hydraulically connected to the housing 110.

Figure 5A:
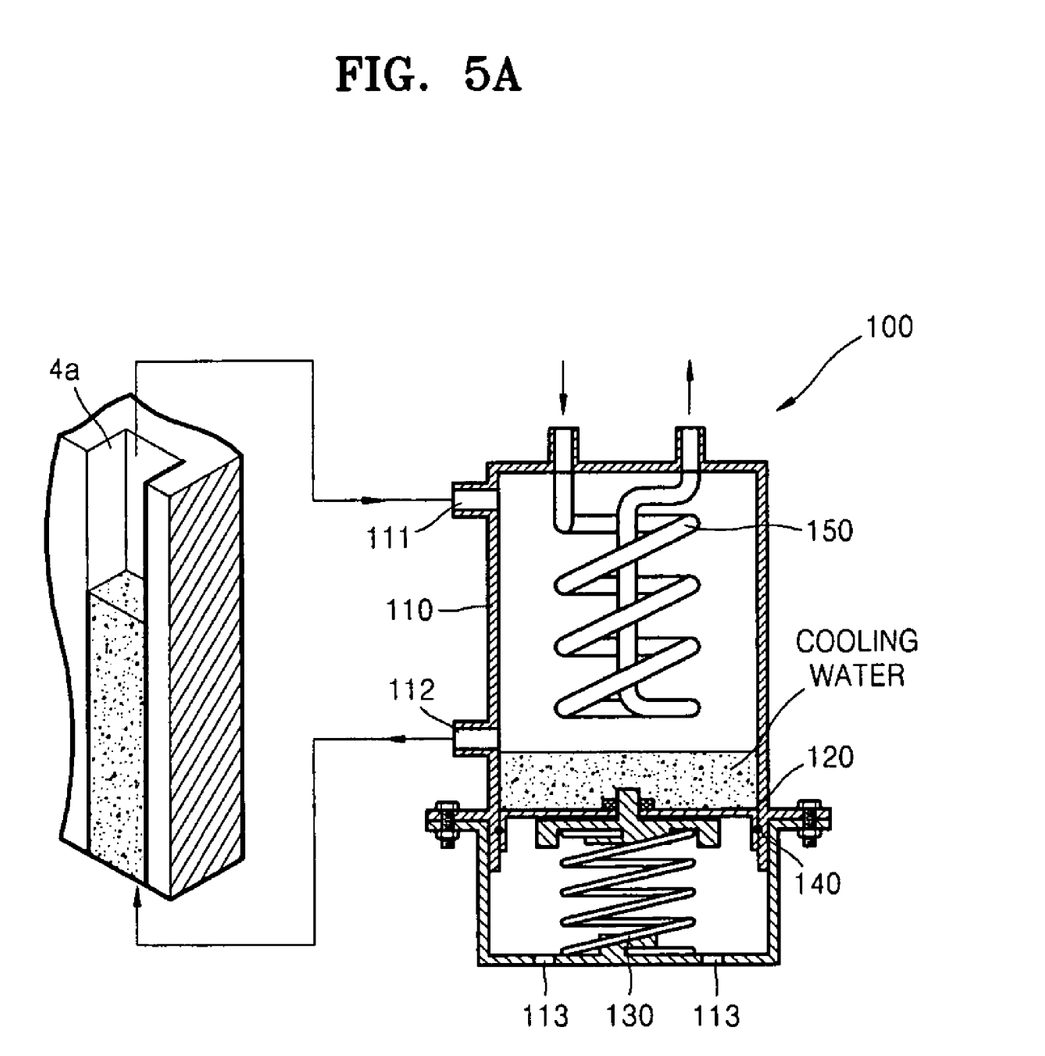
FIGS. 5A and 5B are cross-sectional views for respectively illustrating a full load operation and a partial load operation of the heat exchanger of FIG. 4.

When the fuel cell having the heat exchanger 100 for cooling operates in a full load state, convection of the cooling water is smoothly achieved since heat is actively generated in the stack 10 and steam pressure in the housing 110 increases. Therefore, as depicted in FIG. 5A, the moving plate 120 is in an equilibrium state where the spring 130 is slightly compressed. Thus, the cooling water circulates through the flow channels 4a between the housing 110 and the stack 10, and heat exchange takes place between the cooling water and secondary cooling water that circulates through a coil shaped flow channel 150. While not required in all aspects, the flow channel 150 may be in the wall of the housing.

Figure 5B:
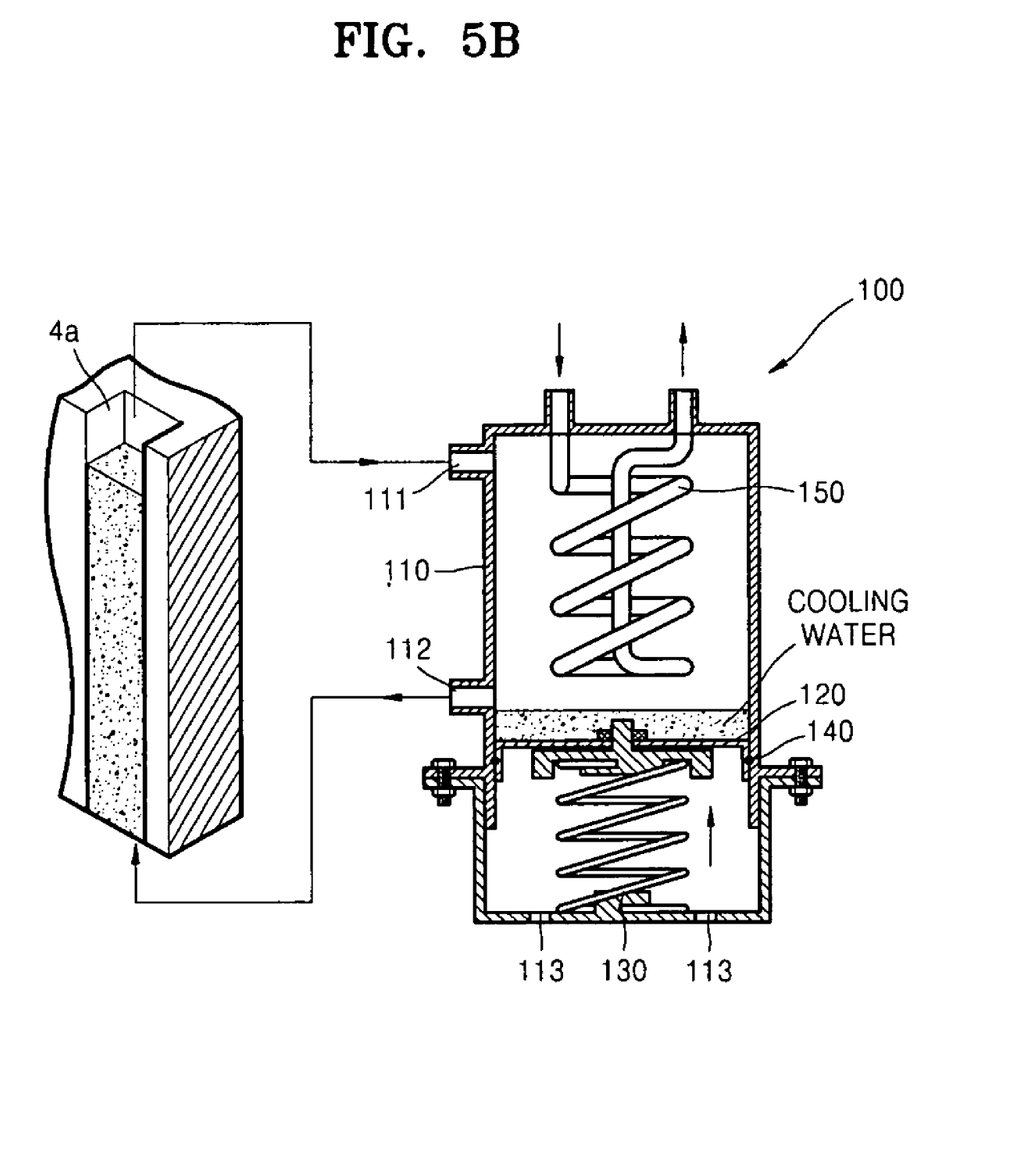

However, when heat generation in the stack 10 is reduced due to a partial load operation, the steam pressure acting in the housing 110 is also reduced. In this state, the steam pressure that presses on the moving plate 120 is relatively reduced, and thus, as depicted in FIG. 5B, the moving plate 120 moves up. Accordingly, a height of the cooling water, that is, the height from the moving plate 120 which is a bottom surface to the outlet 112 is reduced. As a result, a larger amount of cooling water flows into the flow channels 4a of the stack 10. Accordingly, the water level of the cooling water filled in each of the cells in the stack 10 rises. Therefore, the cooling water can easily boil and overflow even when a small amount of heat is generated in the stack 10, and thus the cooling water can flow into the housing 110 of the heat exchanger 100. In this way, if the circulation of the cooling water is smooth, no region of the flow channels 4a is exposed to superheated steam, thereby ensuring the safety of the stack 10.

In other words, the heat exchanger 100 according to an aspect of the present invention does not control the circulation of cooling water by controlling closing or opening of a valve using a controller after measuring the temperature of the cooling water like in the related art, but the water level in the housing 110 is automatically controlled while a mechanical equilibrium between the steam pressure and the spring 130 is maintained. Accordingly, differences in heat generated in a full load operation and a partial load operation can be automatically controlled without using complicated electronic apparatuses such as a thermo-sensor 30, a valve, and a controller like in the related art.

Figure 9A:
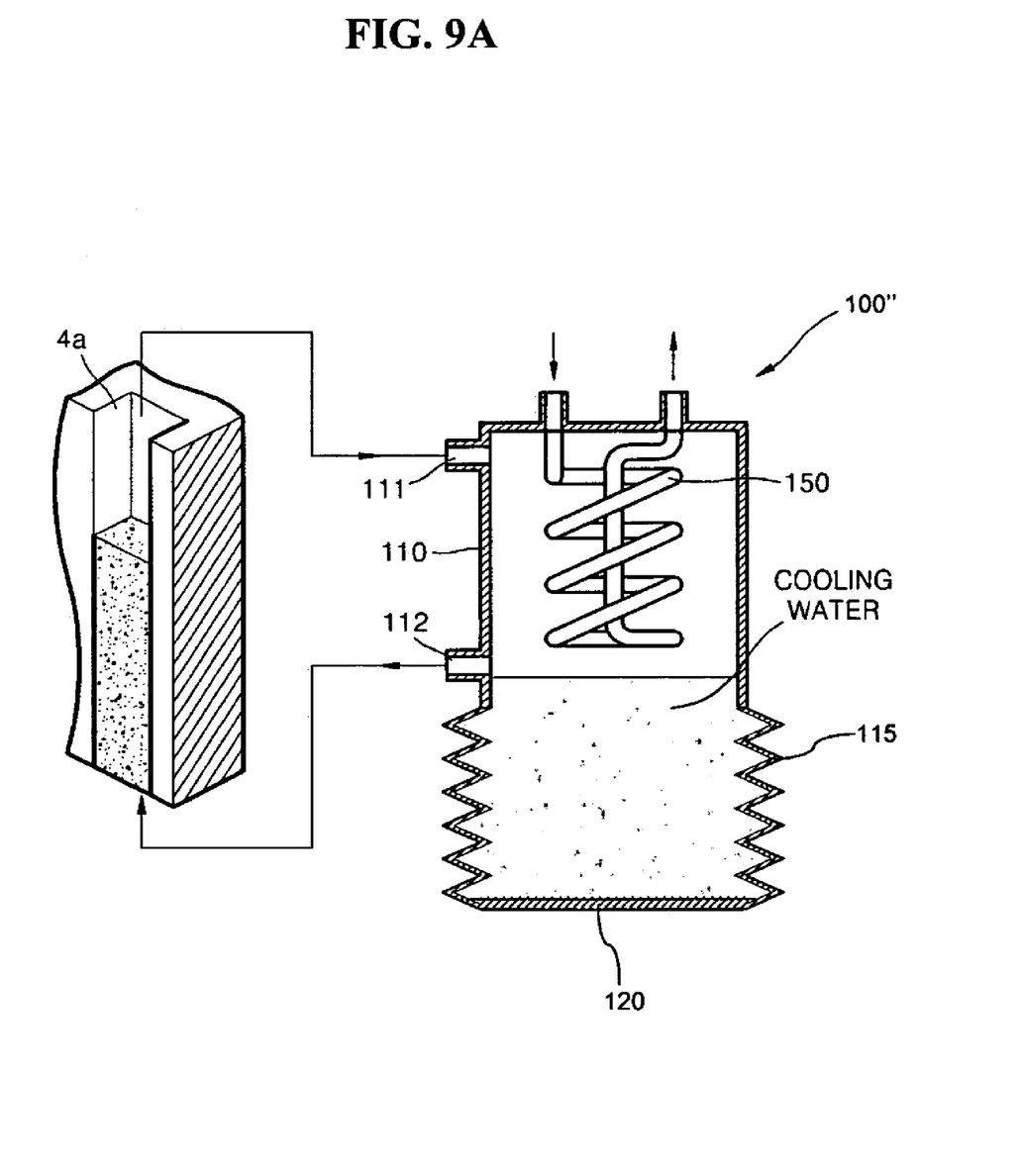
FIGS. 9A and 9B are cross-sectional views for respectively illustrating a full load operation and a partial load operation of the heat exchanger according to another embodiment of the present invention.
Figure 9B:
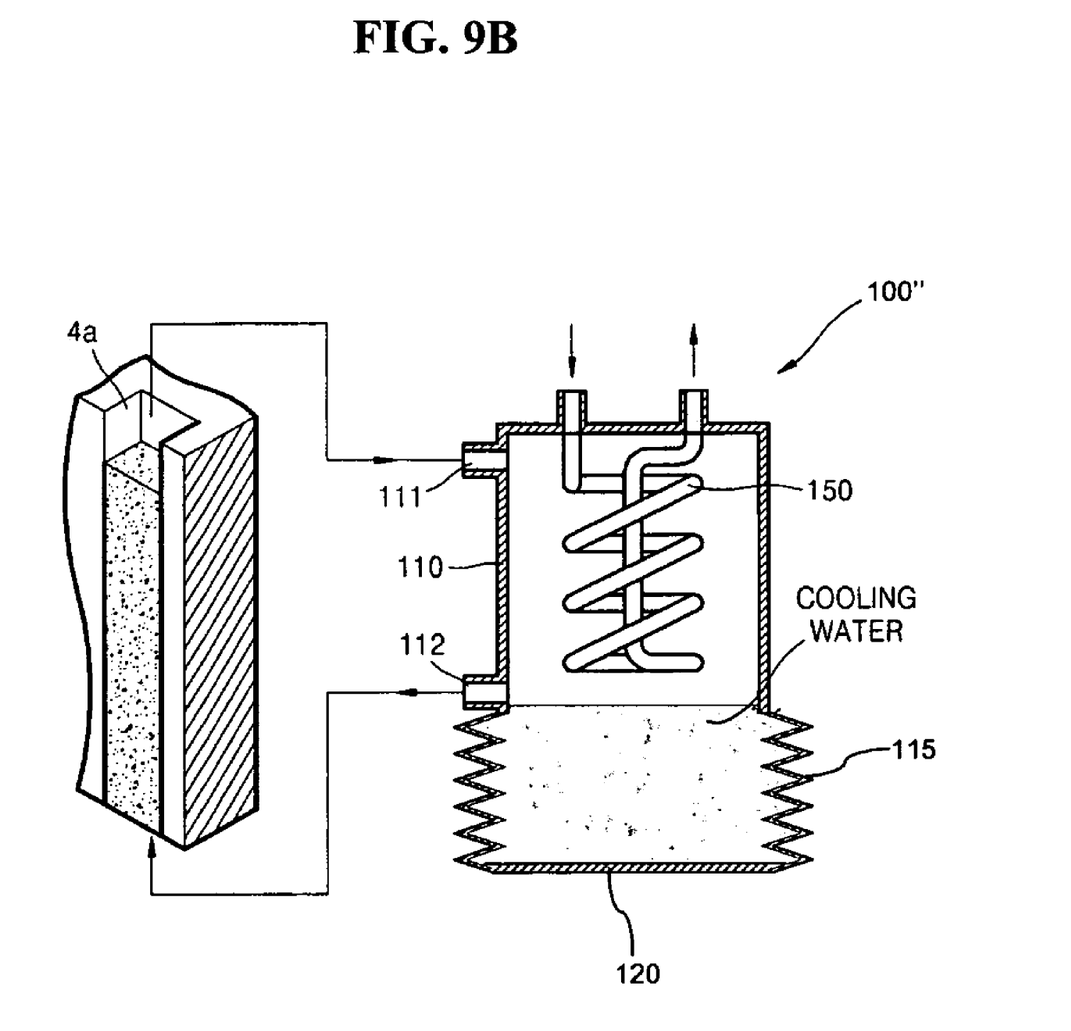

According to an embodiment of the present invention, the housing 110 may include an elastic bellows 115 in a lower portion as shown in FIGS. 9A and 9B. In such an embodiment the O-ring 140, spring 130, and air holes 113 may not be required. The operation of the fuel cell having the heat exchanger 100″ with a lower bellows operates the same as that described above in reference to FIG. 5A and FIG. 5B in a full load and partial load states, respectively, with the bellows supplying the elastic force.

A moving distance ΔX of the moving plate 120 between a full load operation and a partial load operation can be calculated using the following equation.

$$\Delta F = k\Delta X = A(P_h - P_{atm})$$

where F is a working force, k is a coefficient of elasticity of the spring 130, A is an area of the moving plate 120, $P_h$ is a steam pressure, and $P_{atm}$ is the atmospheric pressure.

Figure 10:
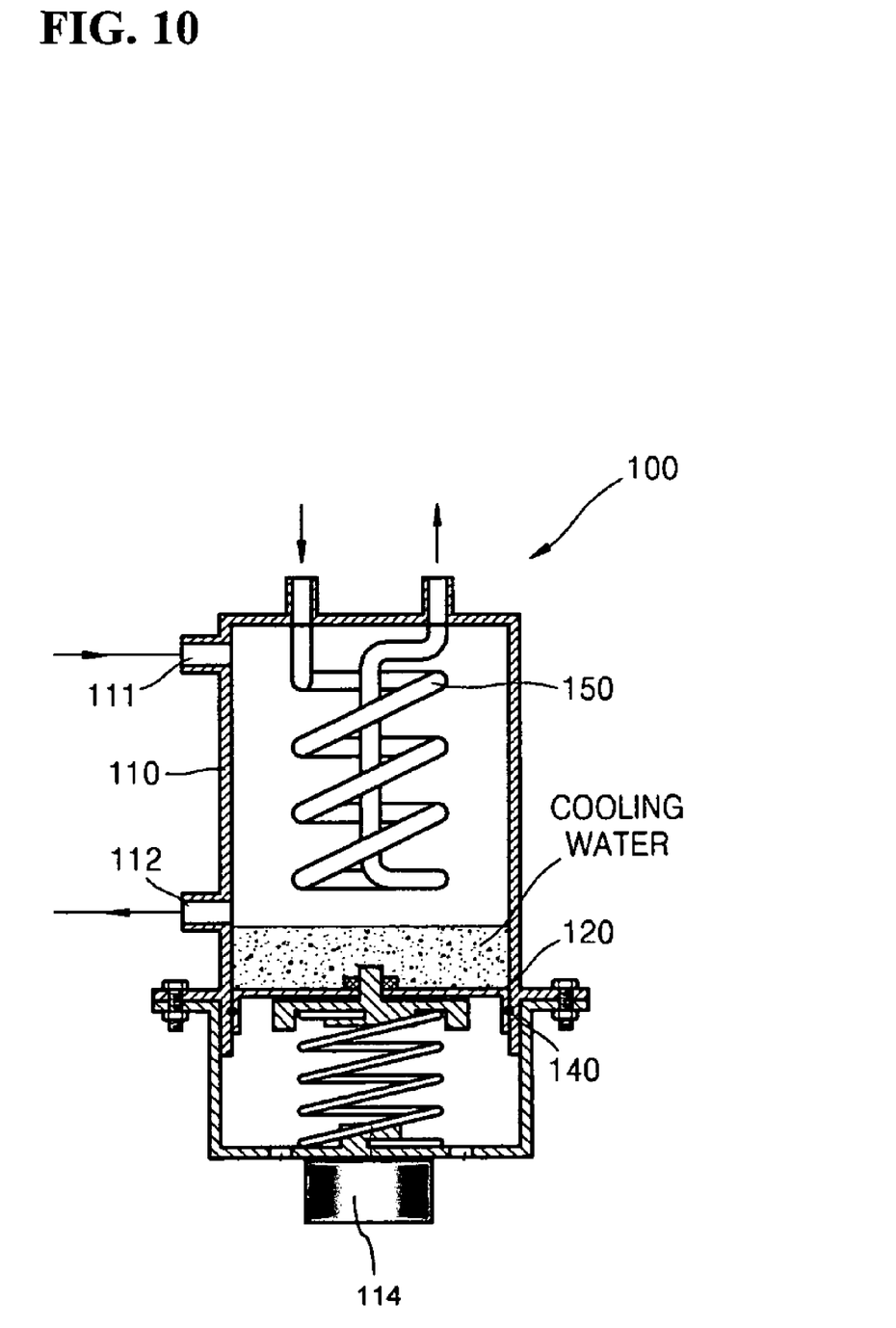
FIG. 10 is a cross-sectional view for illustrating a heat exchanger according to another embodiment of the present invention.

The housing 110 and the moving plate 120 may be formed of a material having high thermal resistance such as stainless steel, rubber, or polymer. An adjustment member 114 may be connected to the spring 130 to increase or decrease the tension in the spring 130 as shown in FIG. 10.

Figure 6:
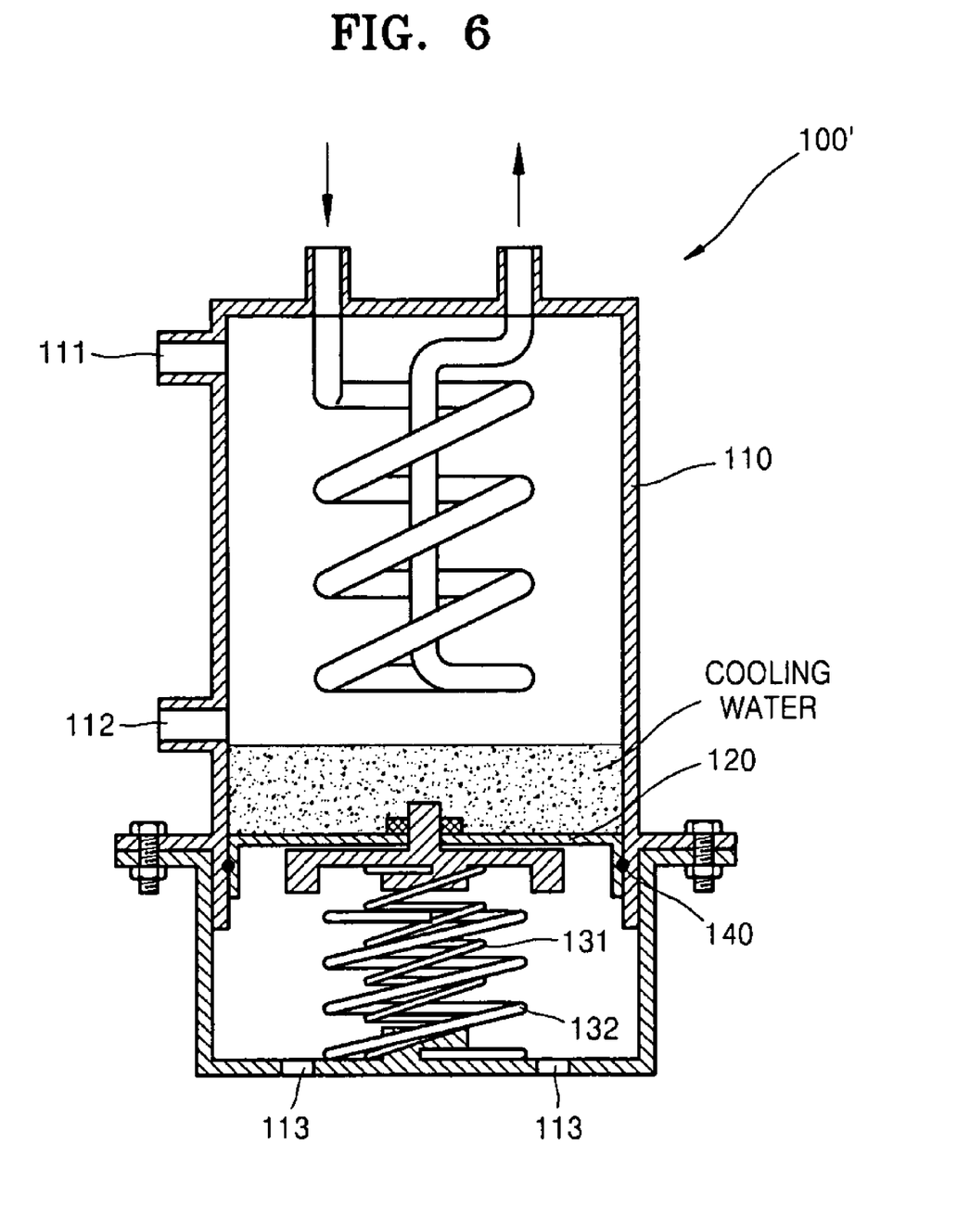
FIG. 6 is a cross-sectional view of a heat exchanger according to another embodiment of the present invention.

FIG. 6 is a cross-sectional view of a heat exchanger 100′ according to another embodiment of the present invention.

The same reference numerals are used to indicate elements identical with those depicted in FIGS. 4 through 5B.

The heat exchanger 100' according to the present embodiment has the same basic structure as the heat exchanger 100, that is, the water level is controlled by the equilibrium between a steam pressure and an elastic force of an elastic member respectively acting on both sides of the moving plate 120. However, the elastic member in FIG. 6 has a double structure in which first and second springs 131 and 132 are combined unlike in the previous embodiment. That is, the first spring 131 provides an elastic force to the moving plate 120 in the entire moving region like in the previous embodiment. The second spring 132 is installed to provide an elastic force to the moving plate 120 when the moving plate 120 moves down by a certain distance, that is, when the moving plate 120 is lowered by a predetermined distance by the increase in the steam pressure. This is because the increase in the steam pressure in the housing 110 according to the increase in the heat generation in the stack 10 is not linear but follows a parabolic curve. In this case, the elastic force of the second spring 132 is added to the first spring 131 when the steam pressure increases rapidly in response to the increase in the heat generation in the stack 10. Therefore, a rapid change of position of the moving plate 120 according to the increase in the steam pressure can be avoided. The rest of the configuration and the principle of operation are the same as in the previous embodiment, and thus, the description thereof will not be repeated.

The use of the heat exchanger 100' according to aspects of the present invention allows an automatic control of the water level in the case of a difference in heat generated between a full load operation and a partial load operation, and also prevents a rapid change of position of the moving plate 120 according to the increase in the steam pressure, thereby further ensuring a stable control.

Figure 7:
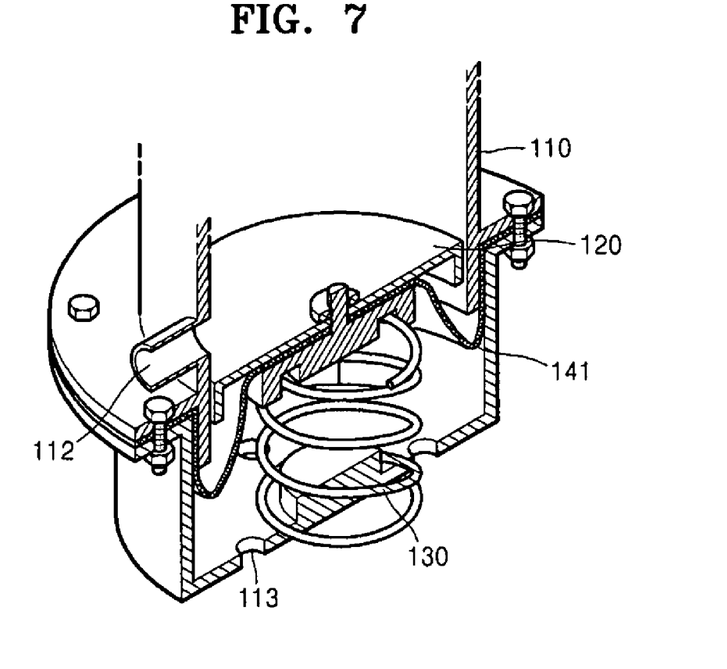
FIGS. 7 and 8 are partial perspective views of a modified version of the fuel cell heat exchanger of FIG. 4.
Figure 8:
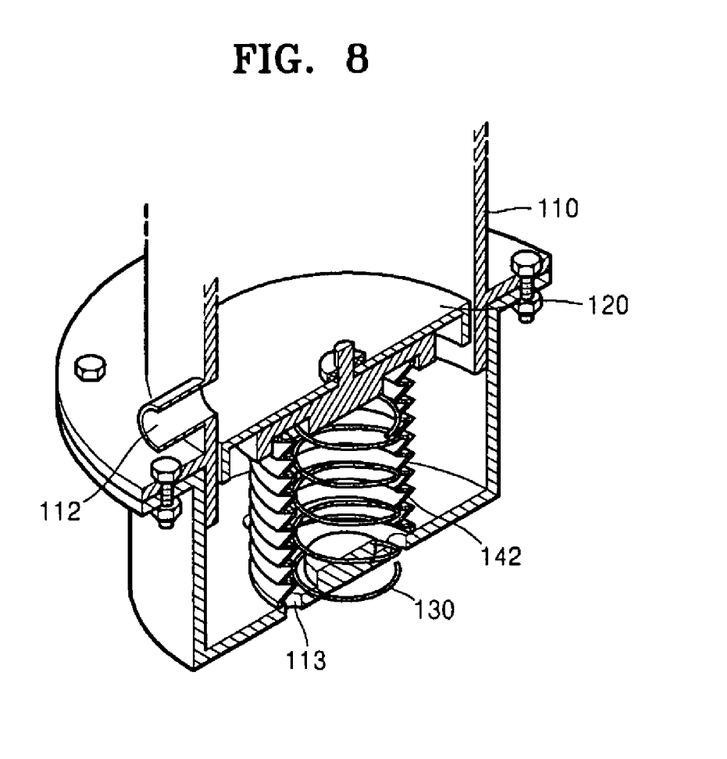

In the above embodiments, the O-ring 140 is used as an element for separating the steam pressure region from the elastic force region, but the present invention is not limited thereto. That is, instead of the O-ring 140, a diaphragm 141 as depicted in FIG. 7 or a bellows tube 142 as depicted in FIG. 8 can also be used.

The heat exchanger, according to aspects of the present invention, has the following advantages. First, variations in the water level caused by a difference in heat generated between a full load operation and a partial load operation can be controlled without using complicated electronic apparatuses such as a thermo-sensor, a valve, or a controller as in the related art. Second, when the fuel cell operates in a partial load state, the exposure of regions of flow channels to superheated steam can be avoided, thereby extending the lifetime of the fuel cell.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A system including a heat exchanger connected to a fuel cell, the system comprising:
   a stack of unit cells in the fuel cell;
   a housing in the heat exchanger having a cooling water inlet and a cooling water outlet connected to the stack of unit cells in the fuel cell;
   a vertically moving plate in the housing of the heat exchanger, positioned below the cooling water outlet, which moves reciprocally in a first direction and a second direction in the housing, the second direction being opposite to the first direction such that the moving plate is movable in the first direction when the housing receives a supply of pressurized steam therein through the cooling water inlet and is movable in the second direction to discharge cooling water in the housing to the stack of unit cells through the cooling water outlet; and
   an elastic member coupled with the moving plate to apply an elastic force in the second direction to the moving plate, the moving plate adjusting an amount of cooling water discharged through the cooling water outlet by varying the water level between the moving plate and the cooling water outlet such that during a period of discharging cooling water through the cooling water outlet the moving plate has an equilibrium state between opposing forces that include the pressurized steam acting in the first direction and the elastic force acting in the second direction.

2. The system of claim 1, further comprising a separation element to separate an upper space of the moving plate where the pressurized steam pressure is applied from a lower space of the moving plate where the elastic force of the elastic member is applied, the separation element being configured to block the flow of cooling water between the upper space and the lower space.

3. The system of claim 1, wherein the separation element comprises an O-ring that is inserted into a rim portion of the moving plate and seals a gap between the moving plate and an inner wall of the housing.

4. The system of claim 1, wherein the separation element comprises a diaphragm that covers the space under the moving plate where the elastic force is applied.

5. The system of claim 1, wherein the separation element is a bellows tube that surrounds the elastic member.

6. The system of claim 1, wherein the housing comprises a flow channel for passing secondary cooling water for exchanging heat with the cooling water that circulates in the stack.

7. The system of claim 6, wherein a wall of the housing comprises a flow channel for passing secondary cooling water for exchanging heat with the cooling water that circulates in the stack.

8. The system of claim 1, wherein an air hole is formed in the housing in an area where the elastic member is disposed so that air freely flows in and out of the housing area where the elastic member is disposed.

9. The system of claim 1, wherein the housing and the moving plate are formed of one material selected from the group consisting of stainless steel, rubber, and polymer.

10. The system of claim 1, wherein the elastic member comprises a first spring that applies a first elastic force to the moving plate in an entire moving distance in the second direction and a second spring that applies a second elastic force to the moving plate when the moving plate moves by a predetermined distance in the first direction.

11. The system of claim 1, wherein the elastic member comprises an adjustment member to increase or decrease the elastic force.

12. A system including a heat exchanger connected to a fuel cell, the system comprising:
   a stack of unit cells in the fuel cell;
   a first housing in the heat exchanger having a cooling water inlet and a cooling water outlet connected to the stack of unit cells in the fuel cell;
   a second housing in the heat exchanger hydraulically connected to the first housing;

a vertically moving plate in the housing of the heat exchanger, positioned below the cooling water outlet, which moves reciprocally in a first direction and a second direction in the second housing, the second direction being opposite to the first direction, such that the moving plate is moveable in the first direction when the first housing receives a supply of pressurized steam therein through the cooling water inlet and is moveable in the second direction to discharge cooling water in the first housing to the stack of unit cells through the cooling water outlet; and an elastic member in the heat exchanger and coupled with the moving plate to apply an elastic force in the second direction to the moving plate, the moving plate adjusting an amount of cooling water discharged through the cooling water outlet by varying the water level between the moving plate and the cooling water outlet such that during a period of discharging cooling water through the cooling water outlet the moving plate has an equilibrium state between opposing forces that include the pressurized steam acting in the first direction and the elastic force acting in the second direction.

13. A system including a heat exchanger connected to a fuel cell, the system comprising:

a stack of unit cells in the fuel cell;

a housing in the heat exchanger having a cooling water inlet and a cooling water outlet connected to the stack of unit cells in the fuel cell;

a vertically moving plate in the housing of the heat exchanger, position below the cooling water outlet, which is configured to automatically control a level of water in the housing by moving in a first direction and a second direction, the second direction being opposite to first direction, such that the moving plate is moveable in the first direction when the housing receives a supply of pressurized steam therein through the cooling water inlet and is moveable in the second direction to discharge cooling water in the housing to the stack of unit cells through the cooling water outlet; and an elastic member in the heat exchanger and coupled with the moving plate, the elastic member being configured to exert an elastic force on the moving plate, the moving plate adjusting an amount of cooling water discharged through the cooling water outlet by varying the water level between the moving plate and the cooling water outlet such that during a period of discharging cooling water through the cooling, water outlet the moving plate has an equilibrium state between the pressurized steam acting in the first direction and the elastic force acting in the second direction.

14. The system of claim 13, wherein the moving plate moves a distance $\Delta X$ between a full load operation and a partial load operation of the fuel cell according to the equation, $$\Delta F = k\Delta X = A(P_h - P_{atm})$$

where F is a working force, k is a coefficient of elasticity of the elastic member, A is an area of the moving plate, $P_h$ is a steam pressure, and $P_{atm}$ is the atmospheric pressure.

15. The system of claim 13, wherein the elastic member is non-linear to exert an automatic control of the water level when heat generated fluctuates between a full load operation and a partial load operation of the fuel cell, and to prevent a rapid change of position of the moving plate according to the increase in the supply of pressurized steam for a stable control.

16. The system of claim 15, wherein the elastic member comprises:

a first spring to exert the elastic force on the moving plate over an entire range of motion of the moving plate; and a second spring to exert a force on the moving plate only over a portion of the range of motion of the moving plate.

* * * * *